United States Patent Office 2,857,381
Patented Oct. 21, 1958

2,857,381

METHOD OF PRODUCING MELAMINE

Harry Edward Jackson and Basil McDonnell, Rossland, British Columbia, Canada, assignors to The Consolidated Mining and Smelting Company of Canada Limited, Montreal, Quebec, Canada, a corporation of Canada No Drawing. Application July 23, 1956
Serial No. 599,294

Claims priority, application Canada July 26, 1955

7 Claims. (Cl. 260—249.7)

This invention relates to the production of melamine. It is particularly directed to an improved process for the production of melamine in which a member of the group consisting of boron and compounds of boron is employed as a catalyst in the melamine forming reaction.

Melamine is a white crystalline compound having the formula $C_3N_6H_6$. It can be produced on a commercial scale by reacting one of the groups: urea, ammonium sulphamate and ammonia; or urea, sulphur dioxide and ammonia; or guanidine sulphamate and ammonia; or mixtures or combinations thereof at elevated temperature and under a superatmospheric pressure of ammonia. The overall reactions involved in producing melamine by the above groups of reactants may be expressed by the following equations:

$$3CO(NH_2)_2 + 3NH_4SO_3NH_2 \rightarrow \quad (1)$$
$$C_3N_6H_6 + 3(NH_4)_2SO_4$$

$$6CO(NH_2)_2 + 9SO_2 + 12NH_3 \rightarrow \quad (2)$$
$$2C_3N_6H_6 + 6(NH_4)_2SO_4 + 3S$$

$$3HNC(NH_2)_2HSO_3NH_2 \rightarrow \quad (3)$$
$$C_3N_6H_6 + 3NH_4SO_3NH_2$$

Guanidine sulphamate is employed as an initial reactant in Reaction 3. Also, it may be formed during the course of Reactions 1 and 2 and some, not having been converted to melamine, may be present in the reaction product. Guanidine sulphamate present in the reaction product can be withdrawn from the process for subsequent treatment, if desired, or it can be recycled to the reaction chamber as an addition to the initial reactants. The addition of guanidine sulphamate to the other reactants employed in Reactions 1 and 2 facilitates the continuous operation of the process as the salt is molten and quite fluid at reaction temperatures and acts as a liquid carrier for the solid material in the reaction product.

A superatmospheric pressure of ammonia is employed in the production of melamine from reactions illustrated by Equations 1, 2 and 3. The pressure of ammonia may vary from about 200 to about 1,000 pounds per square inch and, preferably, is at least about 500 pounds per square inch. The ammonia is provided by adding it to the initial reactants. In conducting the reaction illustrated by Equation 2, ammonia is added in excess of the stoichiometric equivalent of the amount necessary for reaction with the urea and sulphur dioxide.

The melamine forming reactions are conducted at a temperature within the range of from about 260° C. to about 360° C., and preferably from about 280° C. to about 330° C. The reactions proceed slowly at temperatures below about 280° C. whereas at temperatures above about 330° C. the reactions proceed rapidly but, also, the rate of decomposition of melamine is relatively rapid at these higher temperatures.

The time required for the production of a reasonable yield of melamine varies from several hours at about 260° C. to a few minutes at 360° C. and higher. The retention time within the preferred temperature range, that is, from about 280° C. to about 330° C. may be from 1 to 4 hours.

The yield of melamine under a typical set of operating conditions suitable for continuous operation, that is, at 300° C., 500 pounds per square inch ammonia pressure, 3 hours retention time, a mol ratio of sulphur dioxide to urea of about 1.5:1 and added guanidine sulphamate in the ratio of 0.8 to 2.3 mols per mol urea, is about 45% of the theoretical yield based on the carbon content of the urea and guanidine sulphamate.

The synthesis reaction for the production of melamine is accomplished by passing the desired reactants into a reaction vessel, for example, an autoclave, wherein the above conditions of pressure and temperature are maintained. For convenience, the sulphur dioxide and ammonia are pumped to the autoclave as liquids and the ammonia sulphamate and guanidine sulphamate, if used, are added admixed with molten urea. The low melting temperature of a urea-guanidine sulphamate mixture permits this portion of the charge to be pumped readily in the molten state into the reaction vessel. All the reactants used are as free from moisture as possible.

Preferably the melamine forming reaction and recovery steps are conducted as a continuous process. The reactants, including ammonia, are passed into a reaction zone, which may be one or more autoclaves, maintained at a temperature of from 280° C. to 330° C. and under a pressure of ammonia of from 500 to 1,000 pounds per square inch. The reaction product is discharged from the reaction zone and passed to a separate cooling or holding vessel wherein it is cooled by evaporation of ammonia. After passing from the cooling vessel through a pressure release vessel where, by the release of ammonia, the pressure is reduced to atmospheric pressure, the reaction product is treated by aqueous extraction methods for the separation and recovery of melamine and of other constituents, if desired. If sulphur dioxide is used, the process may also include the use of a mixing vessel which acts as a preliminary reaction zone prior to the main reaction zone.

There is a problem in conducting the melamine synthesis. When the melamine forming reaction is conducted at a relatively low temperature, below about 280° C., the reaction proceeds slowly. As the temperature is increased, the reaction proceeds progressively more rapidly but there is an increasing tendency for the melamine to decompose into condensation products such as melam, melem and melon. Also, the reaction mixture is more corrosive at temperatures above 300° C. than at somewhat lower temperatures, necessitating the use of relatively costly corrosion resistant material which may have only a relatively short life.

We have found that a satisfactory yield of melamine can be obtained within a reasonable time period and at a temperature at which corrosion and the formation of condensation products are greatly lessened by conducting the melamine synthesis in the presence of a finite amount of a member of the group consisting of boron and compounds containing boron. According to the present improved method, the melamine synthesis can be conducted to produce a satisfactory yield of melamine at substantially lower temperatures and in shorter periods of time than were heretofore possible to realize. The addition of boron as such or as contained in a compound of boron to the reaction mixture permits operation of the melamine synthesis at a temperature of from about 200° C. to about 360° C. However, the preferred temperature for conducting the reaction is reduced from the heretofore preferred range of from 280° C. to 330° C. to a lower range of from about 240° C. to about 300° C. This lower range is preferred for the reasons that a satisfactory yield of melamine is obtained within a reasonable period of time, the decomposition of melamine and formation of undesired condensation products and the corrosive effects of the reaction mixture are greatly lessened within this temperature range and improved operation control of the reaction is possible.

We have found that the effect of the boron-containing substance varies somewhat with the temperature at which the melamine synthesis is conducted and also with the amount of the substance used, although it is found that only a small amount is necessary. We have found further that the catalytic effect of the boron or boron containing substance is appreciable with amounts as small as 0.001% by weight of the total reactant charge. Larger amounts, up to 10% by weight of the charge, can be used but with such larger amounts some undesirable insoluble material tends to form in the reaction product. An amount of catalyst equivalent to about 0.5% by weight of the total reaction charge is found to be effective over the full range of temperatures used in conducting the synthesis reaction.

The catalytic effect of the presence of boron and of compounds thereof has been observed with the following combinations of reactants: guanidine sulphamate and ammonia; urea, guanidine sulphamate, ammonium sulphamate and ammonia; urea, ammonium sulphamate and ammonia; urea, guanidine sulphamate, sulphur dioxide and ammonia; and urea, sulphur dioxide and ammonia. The catalyst can be added conveniently to the reaction zone admixed with the molten urea or with the guanidine sulphamate if the latter is the only reactant apart from the ammonia being employed, and can be separated readily from the melamine product in the water extraction method used for the separation and recovery of the melamine. No special separation steps are required to remove catalyst from the reaction product, particularly when amounts in the order of about 0.5% by weight are employed.

The boron-containing substances which we have found effective as catalysts for melamine production include, but are not necessarily limited to, elemental boron, boron nitride, boron carbide, boron fluorides, boron oxdes, boron acids, borates and mixtures thereof, and boron-phosphorus compounds such as the product obtained by heating boric acid or a boron oxide with orthophosphoric acid or other phosphoric acids or phosphorus pentoxide. Of this group of catalysts, the most effective appear to be boron compounds of the group boron oxides, boron acids, metaborates, tetraborates and boron fluorides. Of the borates, those of the alkali metals and ammonia appear to give the best results. The terms "boron fluorides" and "boron fluoride" as used above and in the claims hereto appended include boron trifluoride, the co-ordination complexes of boron trifluoride, for example, boron trifluoride ether complex, $BF_3(C_2H_5)_2O$, and such derivatives as the hydroxyfluoboric acids and their salts and the fluoboric acids and their salts, for example, ammonium fluoborate. Some boron compounds are less effective than others. For example, ferric borate, sodium perborate and potassium fluoborate have only a moderate effect on the reaction as compared with the effect obtained with boric oxide. Methods of preparing these compounds are known in the art.

The improved results in the use of these catalysts in melamine production are illustrated by the results obtained when heating the various combinations of reactants set out hereinabove. The melamine synthesis reactions can be represented by Equations 1, 2 and 3 above, or combinations thereof. Results of tests using a number of different combinations of reactants, boron-containing substances and operating conditions are set out in Table I. The results of tests with uncatalyzed reaction mixtures under exactly the same conditions, except for the catalyst addition, are also included in Table I. The tests were conducted using a superatmospheric pressure of ammonia of about 600 pounds per square inch. The percentage yields of melamine shown are based on the carbon content of the reactants and the percentage of catalyst is based on the total weight of the reactants.

*Table I*

Key to reaction mixtures:
- A. Guanidine sulphamate and ammonia.
- B. Urea, guanidine sulphamate, ammonium sulphamate and ammonia.
- C. Urea, ammonium sulphamate and ammonia.
- D. Urea, guanidine sulphamate, sulphur dioxide and ammonia.
- E. Urea, sulphur dioxide and ammonia.

| Catalysts | | Reaction Mixture | Conditions | | Melamine Yield, Percent | |
|---|---|---|---|---|---|---|
| Name | Percent Used | | Temp., °C. | Time, Min. | Catalyzed | Uncatalyzed |
| Boric oxide, $B_2O_3$ | 0.001 | A | 240 | 35 | 5.7 | 1.6 |
| | 0.5 | A | 209 | 35 | 2.3 | 1.5 |
| | 0.5 | A | 316 | 35 | 45.3 | 33.2 |
| | 0.5 | A | 276 | 10 | 18.9 | 0.8 |
| | 0.5 | B | 276 | 30 | 48.9 | 4.5 |
| | 0.5 | B | 276 | 120 | 4.7 | 0.8 |
| | 0.5 | C | 240 | 30 | 40.3 | 5.4 |
| | 0.5 | D | 276 | 30 | 37.2 | 4.3 |
| | 0.5 | E | 276 | 30 | 34.3 | 3.9 |
| | 10.0 | A | 260 | 30 | 30.8 | 4.5 |
| Orthoboric acid, $H_3BO_3$ | 0.5 | B | 276 | 30 | 47.0 | 4.5 |
| Ammonium tetraborate, $(NH_4)_2B_4O_7$ | 0.5 | B | 276 | 30 | 36.0 | 4.5 |
| Sodium tetraborate, $Na_2B_4O_7$ | 0.5 | B | 276 | 30 | 44.8 | 4.5 |
| Lithium metaborate, $LiBO_2$ | 0.5 | B | 276 | 30 | 38.7 | 4.5 |
| Potassium metaborate, $KBO_2$ | 0.5 | A | 276 | 30 | 33.8 | 6.4–7.2 |
| Boron trifluoride, $BF_3$ (added in the form of the ammonia coordination complex) | 0.5 | B | 276 | 30 | 34.0 | 4.5 |
| | 0.5 | B | 276 | 30 | 41.7 | 4.5 |
| Boron trifluoride, ether complex, $BF_3(C_2H_5)_2O$ | 0.5 | A | 276 | 30 | 32.4 | 6.4–7.2 |
| Dihydroxyfluoboric acid, $HBF_2(OH)_2$ | 0.5 | B | 276 | 30 | 35.2 | 4.5 |
| Boron, B | 0.5 | B | 276 | 30 | 9.8 | 4.5 |
| Boron nitride, BN | 0.5 | A | 275 | 35 | 16.2 | 10.5 |
| Boron arsenate | 0.5 | B | 276 | 30 | 15.0 | 4.5 |

Table II illustrates the results obtained when reacting urea and ammonium sulphamate under a superatmospheric pressure of ammonia. The catalyst employed was a boron phosphate compound prepared by heating together boric acid and orthophosphoric acid, in the ratio of 6.2 grams $H_3BO_3$ to 11.5 grams 85% $H_3PO_4$, at a temperature up to about 80° C. for about 10 minutes. The formation of boron phosphate was indicated by a change in appearance. The resulting product was dried at 120° C. for about an hour. The resulting compound is identified herein as a boron phosphate.

Table II

| Temperature, °C. | Mol ratio Urea:Ammonium Sulphamate | $NH_3$ Pressure, p. s. i. | Time, hours | Percent Catalyst by weight | Percent Yield of Melamine |
|---|---|---|---|---|---|
| 260 | 1:2 | 1,000 | 5 | None | 12.3 |
| 260 | 1:2 | 1,000 | 5 | 0.1 | 28.9 |
| 280 | 1:2 | 1,000 | 2 | none | 12.2 |
| 280 | 1:2 | 1,000 | 2 | 0.1 | 29.6 |
| 280 | 1:2 | 1,000 | 2 | 0.2 | 49.0 |

It will be noted from the above examples that a satisfactory yield of melamine can be obtained within a reasonable period of time, for example, from 10 minutes to 2 hours, when conducting the synthesis reaction at a temperature within the range of from about 240° C. to about 300° C. When operating within this temperature range, the corrosive effect of reaction mixtures and the production of undesired condensation products are substantially reduced. In addition, with the increased rate of the reaction and the consequent reduced time of retention of the reaction mixture in the reaction zone, a smaller reaction vessel can be used, or alternatively increased production can be obtained without a corresponding increase in the size of the reaction vessel.

It will be understood, of course, that modifications can be made in the preferred embodiment of the invention described herein without departing from the scope of the invention defined by the appended claims.

What we claim as new and desire to protect by Letters Patent of the United States is:

1. In a process for the production of melamine in which ammonia and at least one group of compounds selected from the groups of compounds consisting of (a) urea and ammonium sulphamate, (b) urea and sulphur dioxide, and (c) guanidine sulphamate, are reacted at a temperature within the range of from about 200° C. to about 360° C. under a superatmospheric pressure of ammonia, the improvement which comprises providing in the reaction mixture in amount of at least 0.001 percent by weight of the total reaction charge a boron-containing substance selected from the group consisting of boron, boron acids, boron oxides, boron fluorides, metaborate and tetraborate compounds, and boron phosphate compounds.

2. The process for the production of melamine according to claim 1 in which the boron-containing substance is a compound selected from the group consisting of ammonium tetraborate and the alkali metal tetraborates.

3. The process for the production of melamine according to claim 1 in which the boron-containing substance is a compound selected from the group consisting of ammonium metaborate and the alkali metal metaborate.

4. The process for the production of melamine according to claim 1 in which the boron-containing substance is boric oxide.

5. The process for the production of melamine according to claim 1 in which the boron-containing substance is boron phosphate.

6. In a process for the production of melamine in which ammonia and guanidine sulphamate are reacted at a temperature within the range of from about 200° C. to about 360° C. under a superatmospheric pressure of ammonia, the improvement which comprises providing in the reaction mixture in amount of at least 0.001% by weight of the total reaction charge a boron-containing substance selected from the group consisting of boron, boron acids, boron oxides, boron fluorides, metaborate and tetraborate compounds, and boron phosphate compounds to catalyze the conversion of guanidine sulphamate to melamine.

7. In a process for the production of melamine in which ammonia, urea and at least one member selected from the group consisting of ammonium sulphamate and sulphur dioxide are reacted at a temperature within the range of from about 200° C. to about 360° C. under a superatmospheric pressure of ammonia and in which the reactants react to form a guanidine compound in the reaction mixture and guanidine compound converts to melamine, the improvement which comprises providing in the reaction mixture in amount of at least 0.001% by weight of the total reaction charge a boron-containing substance selected from the group consisting of boron, boron acids, boron oxides, boron fluorides, metaborate and tetraborate compounds, and boron phosphate compounds to catalyze the conversion of guanidine compound to melamine.

References Cited in the file of this patent

UNITED STATES PATENTS

| 2,550,659 | Vingee | Apr. 24, 1951 |
| 2,698,344 | Mills | Dec. 28, 1954 |

FOREIGN PATENTS

| 1,083,791 | France | Jan. 12, 1955 |
| 653,522 | Great Britain | May 16, 1951 |

OTHER REFERENCES

Savatier: "Catalysis in Organic Chemistry" (Van Nostrand Co., 1923), pages 246–248.